US011553132B2

(12) United States Patent
Cai et al.

(10) Patent No.: US 11,553,132 B2
(45) Date of Patent: Jan. 10, 2023

(54) METHOD OF CORRECTING POSITION DETECTING SIGNAL AND POSITION DETECTING DEVICE

(71) Applicant: TDK Corporation, Tokyo (JP)

(72) Inventors: Yongfu Cai, Tokyo (JP); Hiraku Hirabayashi, Tokyo (JP); Shusuke Ichihashi, Tokyo (JP)

(73) Assignee: TDK Corporation, Tokyo (JP)

( * ) Notice: Subject to any disclaimer, the term of this patent is extended or adjusted under 35 U.S.C. 154(b) by 52 days.

(21) Appl. No.: 17/126,551

(22) Filed: Dec. 18, 2020

(65) Prior Publication Data
US 2021/0203852 A1    Jul. 1, 2021

(30) Foreign Application Priority Data
Dec. 26, 2019   (JP) .............................. JP2019-236767

(51) Int. Cl.
*H04N 5/232*    (2006.01)
*G03B 13/36*    (2021.01)
*G01D 5/14*    (2006.01)

(52) U.S. Cl.
CPC ......... *H04N 5/23287* (2013.01); *G01D 5/145* (2013.01); *G03B 13/36* (2013.01); *G03B 2205/0007* (2013.01)

(58) Field of Classification Search
CPC .................. G03B 13/36; G03B 2205/0007
See application file for complete search history.

(56) References Cited

U.S. PATENT DOCUMENTS

| 2005/0258825 A1* | 11/2005 | Masuda ................. G03B 17/02 |
| | | 348/E5.046 |
| 2016/0231528 A1 | 8/2016 | Wong et al. |
| 2016/0349136 A1* | 12/2016 | Ausserlechner ....... G01D 3/021 |
| 2018/0046063 A1 | 2/2018 | Sharma |
| 2019/0128698 A1* | 5/2019 | Umehara ................. G02B 7/00 |

FOREIGN PATENT DOCUMENTS

| JP | 2017-58523 A | 3/2017 |
| JP | 6517302 B1 | 5/2019 |

* cited by examiner

*Primary Examiner* — Noam Reisner
(74) *Attorney, Agent, or Firm* — Posz Law Group, PLC (57) ABSTRACT

The position detecting device of the present invention is a device for detecting the position of a movable detection target within a predetermined movable range. The position detecting device comprises: a first magnet (13A) and a second magnet (13B) which are arranged so as to move integrally with the movement of the detection target; a first magnetic detecting circuit (20A) that detects the magnetic field of the first magnet (13A) and a second magnetic detecting circuit (20B) that detects the magnetic field of the second magnet (13B), which are arranged at positions outside the movable range; and a differential amplifier (8) that amplifies the difference between the detection signals of the magnetic field output from the first magnetic detecting circuit (20A) and the second magnetic detecting circuit (20B), and that outputs the amplified difference of the signal as a position detecting signal of the detection target.

10 Claims, 10 Drawing Sheets

METHOD OF CORRECTING POSITION DETECTING SIGNAL AND POSITION DETECTING DEVICE

BACKGROUND OF THE INVENTION

1. Field of the Invention

The present invention relates to a method of correcting a position detecting signal using a magnetic sensor and a position detecting device.

2. Description of the Related Art

Recently, a position detecting device including a magnetic sensor is utilized in various applications. For example, US 2016/0231528 A1 (hereinafter referred to as "Patent Document 1") and US 2018/0046063 A1 (hereinafter referred to as "Patent Document 2") describe a position detecting device for detecting the position of a lens using a magnetic sensor in a camera module having an auto-focus mechanism built in a smartphone. The position detecting device described in Patent Documents 1 and 2 comprises: a fixed driving magnet for moving the lens; a sense magnet that moves with the lens; and a magnetic sensor that is applied to a composite magnetic field of the driving magnetic field generated by the driving magnet and the sense magnetic field generated by the sense magnet. In such a configuration, the magnitude of the sense magnetic field in the magnetic sensor is changed depending on the distance between the magnetic sensor and the lens, and the direction of the composite magnetic field is changed accordingly. Therefore, it is possible to detect the position of the lens by measuring the change in the direction of the composite magnetic field with the magnetic sensor.

Furthermore, in JP 6517302 B (hereinafter referred to as "Patent Document 3"), even when an external magnetic field that is not the driving magnetic field and the sense magnetic field is applied to the magnetic sensor (noise magnetic field), the position detecting device that can accurately detect the position of the lens is described. The position detecting device described in Patent Document 3 includes a plurality of sense magnets that move with the lens, and a plurality of magnetic sensors that are arranged corresponding to the sense magnets, respectively, and the influence of the noise magnetic field is reduced by adding the detection results measured by the plurality of magnetic sensor.

Patent Documents 1 to 3 propose a configuration comprising a plurality of magnetic sensors to reduce the influence of the noise magnetic field applied to the magnetic sensor, but the position of the lens can be detected as long as a configuration comprises one set of sense magnet and magnetic sensor.

Recently, some camera modules have an image stabilizing function to reduce distortion of picture and video caused by camera shake. An electronic image stabilizer and an optical image stabilizer are known to perform an image stabilizer function. The electronic image stabilizer is a method to correct the camera shake by signal processing the captured picture and video. Therefore, the camera module incorporates the optical image stabilizer (hereinafter referred to as "OIS"). The OIS is a method, when the camera shake is detected by a gyro sensor or the like, for reducing the camera shake by moving the image sensor or lens in the direction opposite to the camera shake direction. The direction in which the image sensor or the lens is moved by OIS is, for example, a direction that is perpendicular to the optical axis of the image sensor and the lens. The OIS also has a configuration in which the image sensor or the lens is rotated about an axis perpendicular to its optical axis.

In the camera module having an OIS mechanism and an auto-focus mechanism for moving a lens, when the lens is moved using the OIS mechanism, the sense magnet also moves with the lens that is a detection target of the position in the auto-focus mechanism. Usually, since a magnetic sensor is fixed at a predetermined place, when the sense magnet is moved by OIS, the positional relationship between the magnetic sensor and the sense magnet is changed. In that case, since the direction of the composite magnetic field applied to the magnetic sensor also changes with OIS, it becomes impossible to accurately detect the position of the lens with the magnetic sensor. The above-mentioned Patent Documents 1 to 3 do not show any method for reducing the deterioration in position detection accuracy due to OIS using the magnetic sensor.

SUMMARY OF THE INVENTION

The present invention has been made to solve the problems of the background art as described above, and an object of the present invention is to provide a method of correcting a position detecting signal and a position detecting device that can accurately detect the position of the detection target, even if the positional relationship between the magnetic sensor and the sense magnet is changed.

To achieve the above object, an exemplary aspect of the present invention provides a method of correcting a position detecting signal, wherein a detection target is movable in a first direction and in a second direction that is perpendicular to the first direction within a predetermined movable range in each direction, for correcting the position detecting signal of the detection target in the first direction in response to movement in the second direction, the method comprising:

arranging a first magnet and a second magnet so as to move integrally with the movement of the detection target;

arranging a first magnetic detecting circuit to detect a magnetic field of the first magnet and a second magnetic detecting circuit to detect a magnetic field of the second magnet, at a position outside the movable range in the first direction, respectively; and amplifying the difference between the detection signals of the magnetic field output from the first magnetic detecting circuit and the second magnetic detecting circuit by a differential amplifier, and outputting the amplified difference between the detection signals as a position detecting signal after correction of the detection target in the first direction.

On the other hand, an exemplary aspect of the present invention provides a position detecting device for detecting the position of a detection target which is movable within a predetermined movable range, comprising:

a first magnet and a second magnet that are arranged so as to move integrally with the movement of the detection target;

a first magnetic detecting circuit that detects a magnetic field of the first magnet and a second magnetic detecting circuit that detects a magnetic field of the second magnet, wherein the first magnetic detecting circuit and the second magnetic detecting circuit are arranged at a position outside the movable range; and a differential amplifier that amplifies the difference between the detection signals of the magnetic field output from said first magnetic detecting circuit and said second magnetic detecting circuit, and that outputs the amplified difference between the detection signals as a position detecting signal of said detection target.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Next, the present invention will be described with reference to the accompanying drawings.

Figure 1:
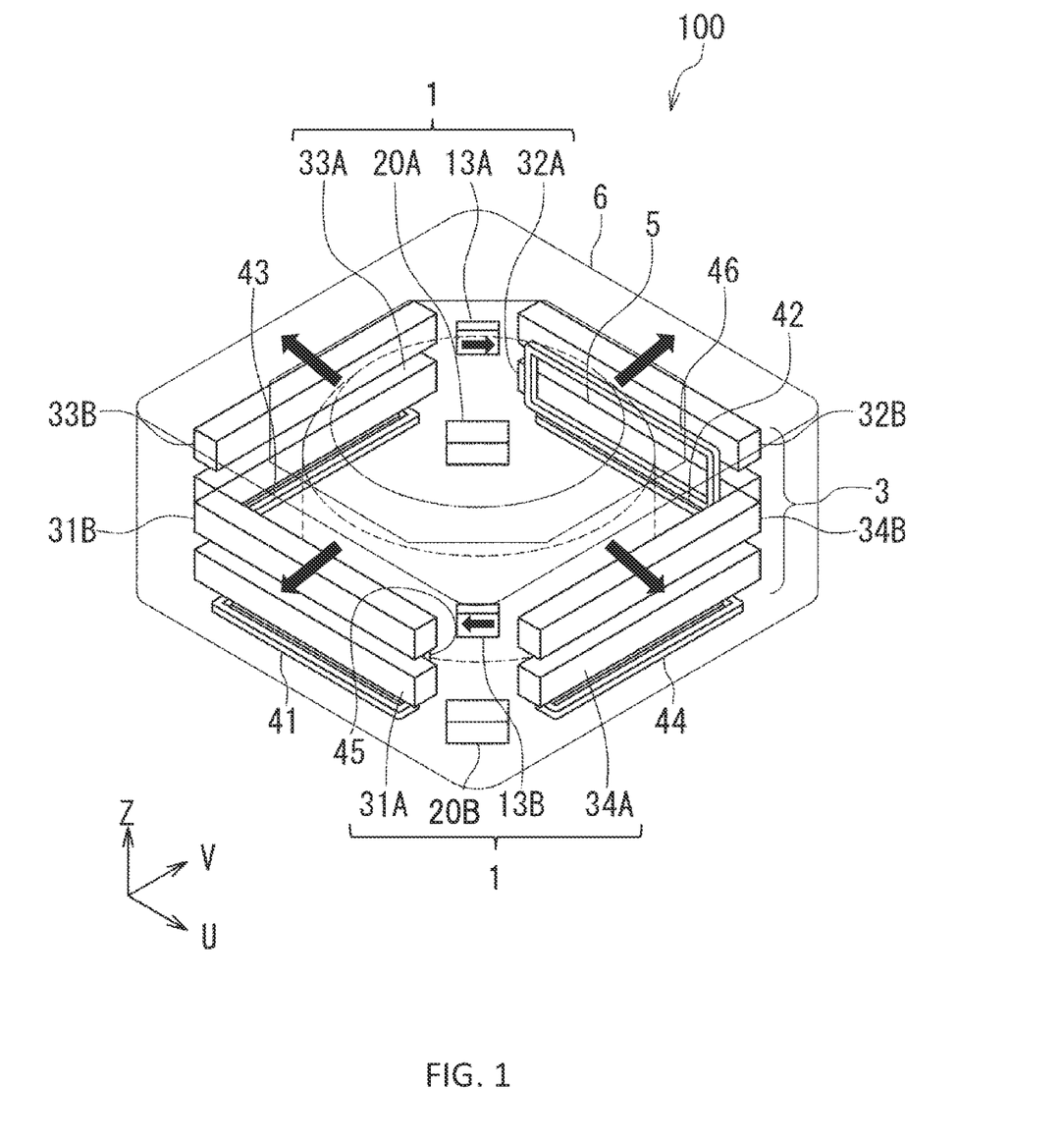
FIG. 1 is a perspective view showing an example of a configuration of a camera module including a position detecting device of the present invention.
Figure 2:
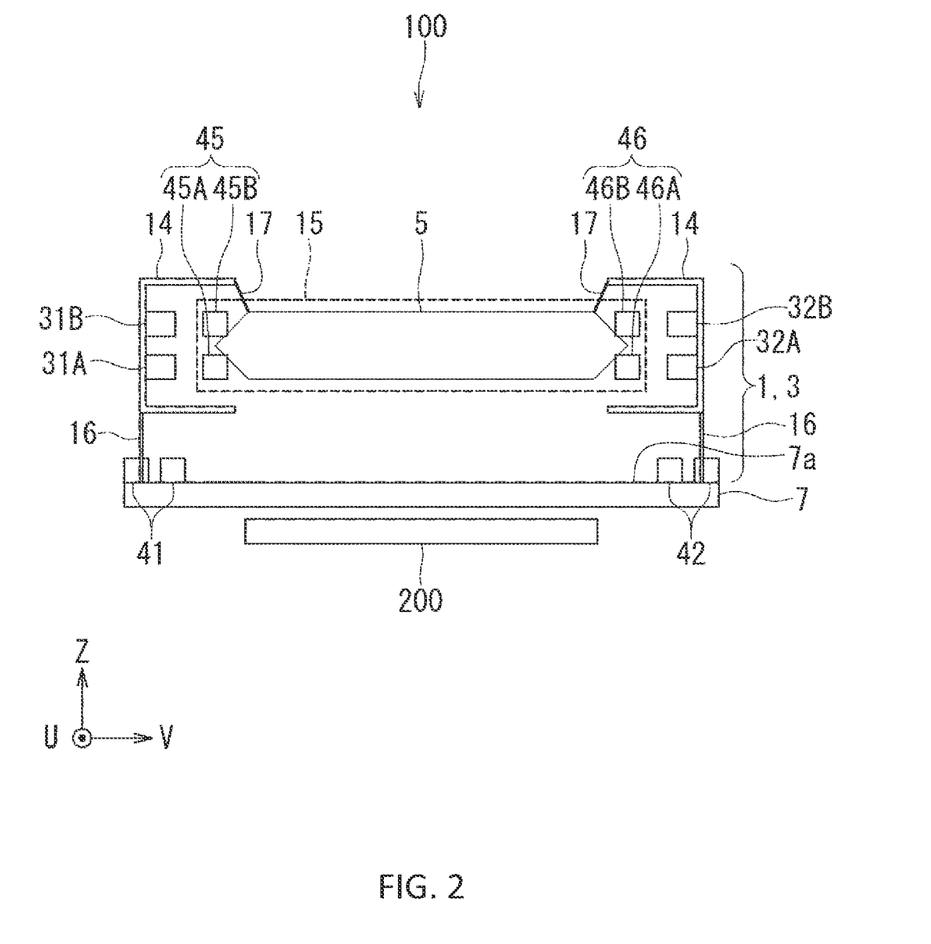
FIG. 2 is a side sectional view showing the inside of the camera module shown in FIG. 1.

First, a configuration of a camera module including the position detecting device of the present invention will be described with reference to FIGS. 1 and 2. FIG. 1 is a perspective view showing an example of a configuration of a camera module including the position detecting device of the present invention, FIG. 2 is a side sectional view showing the inside of the camera module shown in FIG. 1. FIG. 2 shows the respective components included in camera module 100 in different dimensions and arrangement from FIG. 1. Camera module 100 shown in FIGS. 1 and 2 constitutes a part of a camera having, for example, an OIS mechanism and an auto-focus mechanism for moving the lens. The present embodiment will be described with reference to camera module 100 shown in FIGS. 1 and 2 as an example, the position detecting device of the present invention is applicable to any configuration which detects the position of the detection target, that moves and that includes sense magnets, by using magnetic sensors.

As shown in FIGS. 1 and 2, camera module 100 comprises position detecting device 1, driving device 3, lens 5, housing 6 and board 7. Position detecting device 1 is a device for detecting the position of lens 5 in activating auto-focus. Driving device 3 is a mechanism, in activating auto-focus, for moving lens 5 in the Z-axis direction that is parallel to the optical axis of lens 5, and, in activating OIS, for moving lens 5 in the U-axis direction and in the V-axis direction which are perpendicular to the optical axis of lens 5. The U-axis direction and the V-axis direction are perpendicular to each other. Z-axis direction is an example of a first direction, U-axis direction or V-axis direction is an example of a second direction. When the direction in the second direction is referred to as the opposite direction, it is assumed that the opposite direction is indicated in the U-axis direction or the V-axis direction determined as the second direction.

Lens 5 is mounted on first holding member 15 as shown in FIG. 2. First holding member 15 is connected with second holding member 14 via first elastic member 17, second holding member 14 is fixed to upper surface 7a of board 7 via second elastic member 16. Therefore, lens 5 is movably supported in the Z-axis direction by first elastic member 17 in activating auto-focus, and is movably supported in the U-axis direction and in the V-axis direction by second elastic member 16 in activating OIS.

Board 7 is a circuit board for wiring and includes an opening (not shown) for passing light passing through lens 5. Camera module 100 is aligned with respect to image sensor 200 such that light passing through lens 5 and the opening of board 7 is entered image sensor 200. Position detecting device 1, driving device 3, lens 5 and board 7 are housed in the housing 6 to protect from dust and the like. In FIG. 1, it is shown by omitting board 7. In FIG. 2, it is shown by omitting housing 6.

Driving device 3 comprises first driving magnets 31A, 31B, second driving magnets 32A, 32B, third driving magnets 33A, 33B, fourth driving magnets 34A, 34B, first coil 41, second coil 42, third coil 43, fourth coil 44, fifth coil 45 and sixth coil 46.

First driving magnets 31A, 31B are in the shape of a rectangular parallelepiped that is long in the U-axis direction, and are magnets in which the magnetization directions are opposite to each other. Similarly, second driving magnets 32A, 32B are in the shape of a rectangular parallelepiped that is long in the U-axis direction, and are magnets in which the magnetization directions are opposite to each other. Third driving magnets 33A, 33B are in the shape of a rectangular parallelepiped that is along in the V-axis direction, and are magnets in which the magnetization directions are opposite to each other. Similarly, fourth driving magnets 34A, 34B are in the shape of a rectangular parallelepiped that is long in the V-axis direction, and are magnets in which the magnetization directions are opposite to each other.

The directions of arrows on first driving magnet 31B, second driving magnet 32B, third driving magnet 33B and fourth driving magnet 34B shown in FIG. 1 indicate examples of respective magnetization directions. The magnetization directions of first driving magnet 31B, second driving magnet 32B, third driving magnet 33B and fourth driving magnet 34B may be opposite directions shown in FIG. 1, respectively.

First driving magnets 31A, 31B, second driving magnets 32A, 32B, third driving magnets 33A, 33B, and fourth driving magnets 34A, 34B are respectively fixed to second holding member 14 in a direction parallel to the Z-axis direction. First driving magnets 31A, 31B, and second driving magnets 32A, 32B are arranged at positions facing each other across first holding member 15. Similarly, third driving magnets 33A, 33B, and fourth driving magnets 34A, 34B are arranged at positions facing each other across first holding member 15.

Fifth coil 45 is fixed to first holding member 15 at a position facing first driving magnets 31A, 31B. Sixth coil 46 is fixed to first holding member 15 at a position facing second driving magnets 32A, 32B.

First coil 41 is arranged on upper surface 7a of board 7 so as to be positioned between first driving magnet 31A and board 7, second coil 42 is arranged on upper surface 7a of board 7 so as to be positioned between second driving magnet 32A and board 7. Similarly, third coil 43 is arranged on upper surface 7a of board 7 so as to be positioned between first driving magnet 33A and board 7, fourth coil 44 is arranged on upper surface 7a of board 7 so as to be positioned between fourth driving magnet 34A and board 7.

First driving magnets 31A, 31B, second driving magnets 32A, 32B, fifth coil 45, and sixth coil 46 constitute a driving mechanism for moving first holding member 15 on which lens 5 is mounted in the Z-axis direction inactivating auto-focus. First driving magnets 31A, 31B, and second driving magnets 32A, 32B are commonly used as the auto-focus mechanism and the OIS mechanism.

First driving magnets 31A, 31B, second driving magnets 32A, 32B, first coil 41, and second coil 42 constitute a driving mechanism for moving first holding member 15 on which lens 5 is mounted in the V-axis direction in activating OIS. Third driving magnets 33A, 33B, fourth driving magnets 34A, 34B, third coil 43, and fourth coil 44 constitute a driving mechanism for moving first holding member 15 on which lens 5 is mounted in the U-axis direction in activating OS.

In such a configuration, in activating auto-focus, fifth coil 45 and sixth coil 46 are respectively supplied a current corresponding to the amount of movement of lens 5 from the control device (not shown). Thus, lens 5 (first holding member 15) can be moved in the Z-axis direction by the well-known Lorentz force generated between first driving magnets 31A, 31B, and fifth coil 45, and by the well-known Lorentz force generated between second driving magnets 32A, 32B, and sixth coil 46.

As shown in FIG. 1, fifth coil 45 and sixth coil 46 are respectively formed in a ling shape. Therefore, in fifth coil 45, coil portion 45A that is arranged at a position facing first driving magnet 31A and coil portion 45B that is arranged at a position facing first driving magnet 31B are currents that flow in the opposite directions. Similarly, in sixth coil 46, coil portion 46A that is arranged at a position facing second driving magnet 32A and coil portion 46B that is arranged at a position facing second driving magnet 32B are currents that flow in the opposite directions. Therefore, first driving magnets 31A, 31B which have the magnetization directions in the opposite direction are arranged, when a current is supplied to fifth coil 45, such that the forces received from the magnetic fields at coil portions 45A, 45B are in the same direction. Similarly, second driving magnets 32A. 32B which have the magnetization directions in the opposite direction are arranged, when a current is supplied to sixth coil 46, such that the forces received from the magnetic fields at coil portions 46A, 46B are in the same direction.

On the other hand, in activating OIS, first coil 41, second coil 42, third coil 43 and fourth coil 44 are respectively supplied currents from the control device (not shown) so as to cancel the amount of detected camera shake. Thus, lens 5 (second holding member 14) can be moved in the V-axis direction by the well-known Lorentz force generated between first driving magnets 31A, 31B, and first coil 41, and by the well-known Lorentz force generated between second driving magnets 32A, 32B, and second coil 42. Similarly, lens 5 (second holding member 14) can be moved in the U-axis direction by the well-known Lorentz force generated between third driving magnets 33A, 33B, and third coil 43, and by the well-known Lorentz force generated between fourth driving magnets 34A, 34B, and fourth coil 44.

In order to solve the problem of the deterioration in position detection accuracy of lens 5, position detecting device 1 of the present embodiment, when activating auto-focus, is reduced due to OIS described above, and comprises two sets of sense magnets and magnetic sensors. These two sets of sense magnet and magnetic sensor are respectively arranged in positions, when lens 5 is moved in a direction that is perpendicular to the Z-axis direction, by OS, such that the change in the directions of the composite magnetic fields applied to the magnetic sensors is canceled. For example, the two sense magnets, in a direction that is perpendicular to the Z-axis direction, may be arranged at positions symmetrical across lens 5 in first holding member 15. The magnetic sensors are arranged at positions where the composite magnetic fields are applied, and positions which are outside the movable range of lens 5 in activating auto-focus, for example, may be arranged on upper surface 7a of board 7.

As shown in FIG. 1, position detecting device 1 of the present embodiment comprises first sense magnet 13A and second sense magnet 13B, first magnetic sensor 20A that is correspondingly provided with first sense magnet 13A, and second magnetic sensor 20B that is correspondingly provided with second sense magnet 13B. First sense magnet 13A and second sense magnet 13B are respectively arranged in first holding member 15 so as to move integrally with lens 5 according to the movement of lens 5 that is a detection target. First sense magnet 13A is an example of a first magnet, second sense magnet 13B is an example of a second magnet. First magnetic sensor 20A is an example of a first magnetic detecting circuit, second magnetic sensor 20B is an example of a second magnetic detecting circuit. The detection signals of the magnetic field output from first magnetic sensor 20A and second magnetic sensor 20B are indicated by a voltage.

As shown in FIG. 1, first sense magnet 13A is arranged, for example, between second driving magnets 32A, 32B and third driving magnets 33A, 33B, second sense magnet 13B is arranged, for example, between first driving magnets 31A, 31B and fourth driving magnets 34A, 34B. In this case, first magnetic sensor 20A is applied to the composite magnetic field between a magnetic field generated by first sense magnet 13A, and a magnetic field generated by second driving magnets 32A, 32B and third driving magnets 33A, 33B. Second magnetic sensor 20B is applied to the composite magnetic field of a magnetic field generated by second sense magnet 13B and a magnetic field generated by first driving magnets 31A. 31B and fourth driving magnets 34A, 34B.

The directions of arrows in first sense magnet 13A and second sense magnet 13B shown in FIG. 1 indicate examples of respective magnetization directions. In examples shown in FIG. 1, the magnetization directions of first sense magnet 13A and second sense magnet 13B are opposite to each other. In this case, the direction of the composite magnetic fields applied to first magnetic sensor 20A and second magnetic sensor 20B are also opposite to each other. The magnetization directions of first sense magnet 13A and second sense magnet 13B may be opposite to the directions shown in FIG. 1. The magnetization directions of first sense magnet 13A and second sense magnet 13B may be the same direction, respectively.

First magnetic sensor 20A and second magnetic sensor 20B are configurations comprising magneto-resistance effect elements for detecting an external magnetic field based on a change in electrical resistance by the magneto-resistance effect. In the magneto-resistance effect element, the electrical resistance is changed according to the direction of magnetization of the free layer and is the smallest when the magnetization direction of the free layer and the fixed layer are matched. The magneto-resistance effect element, for example, comprises a fixed layer in which the magnetization direction is fixed, an insulating layer made of an insulator and a free layer in which magnetization direction is changed in accordance with the direction of the external magnetic field, and the magneto-resistance effect element is a structure in which the fixed layer, the insulating layer and the free layer are laminated in this order. In the following, when both first magnetic sensor 20A and second magnetic sensor 20B are shown, it may be referred to as "magnetic sensor 20". In addition, when both first sense magnet 13A and second sense magnet 13B are shown, it may be referred to as "sense magnet 13".

Figure 3:
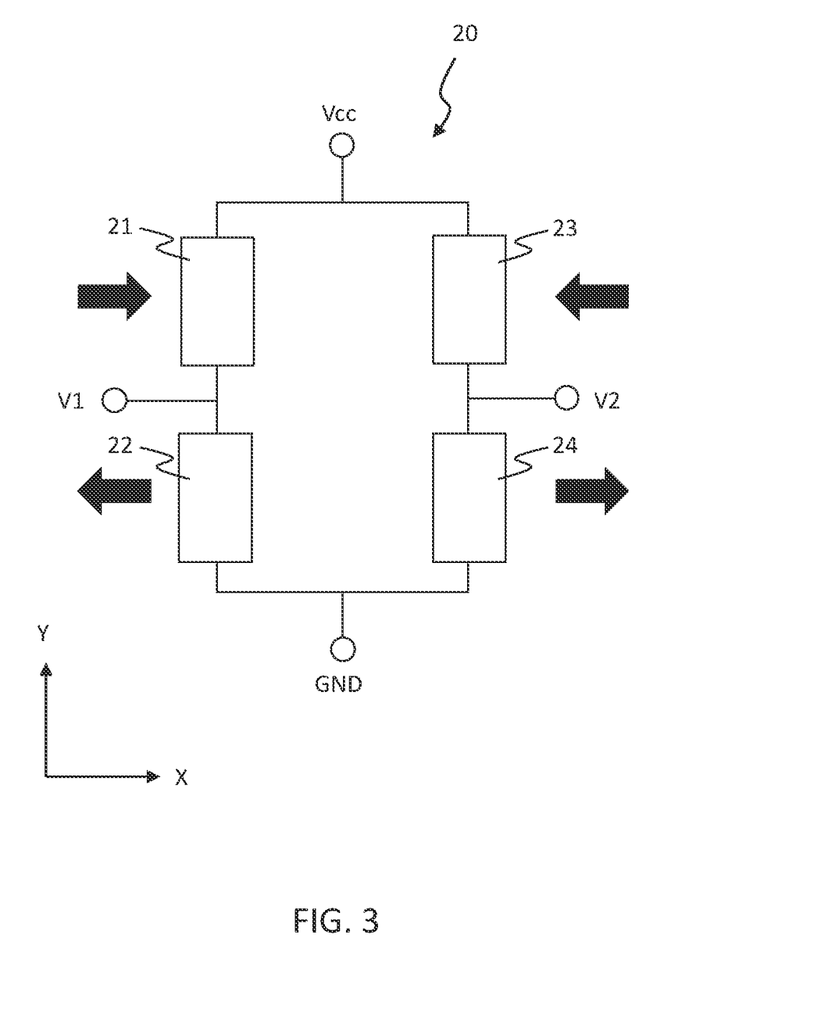
FIG. 3 is a circuit diagram showing a configuration example of a first magnetic sensor and a second magnetic sensor shown in FIG. 1.

FIG. 3 is a circuit diagram showing an example of a configuration of first magnetic sensor 20A and second magnetic sensor 20B shown in FIG. 1.

As shown in FIG. 3, magnetic sensor 20 includes four magneto-resistance effect elements (first magneto-resistance effect element 21, second magneto-resistance effect element 22, third magneto-resistance effect element 23, fourth magneto-resistance effect element 24), and is a configuration in which a bridge circuit (Wheatstone bridge circuit) is made by connecting them to each other. Four magneto-resistance effect elements 21-24 are divided into two sets of 21, 22, and 23, 24, magneto-resistance effect elements 21, 22 are connected in series and magneto-resistance effect elements 23, 24 are connected in series. Each set of the ends of magneto-resistance effect elements 21, 22, and 23, 24 are connected and are supplied constant power supply voltage (Vcc) from the voltage source (not shown), and the other ends of magneto-resistance effect elements 21, 22, and 23, 24 are grounded (GND), respectively. Wheatstone bridge circuit allows extraction of the mid-point voltages (V1, V2) respectively from the connection points of the two magneto-resistance effect elements of each set. The mid-point voltages (V1, V2) are detection signals of the magnetic field output from magnetic sensor 20. The arrows shown in FIG. 3 represent examples of the magnetization directions of the fixed layer of each magneto-resistance effect element. X direction shown in FIG. 3 is a magneto-sensitive direction of the magneto-resistance effect element, and corresponds to the magnetization direction of the fixed layer. Y direction is a direction which is perpendicular to the magneto-sensitive direction (X direction) of the magneto-resistance effect element. In the following, the arrow indicating X direction in FIG. 3 is referred to as +X direction, the direction opposite to the arrow is referred to as −X direction.

In magnetic sensor 20 shown in FIG. 3, when an external magnetic field is applied in the +X direction, the electrical resistance of first and fourth magneto-resistance effect elements 21 and 24 is reduced, the electrical resistance of second and third magneto-resistance effect elements 22 and 23 is increased. Thus, mid-point voltage V1 is increased, and mid-point voltage V2 is lowered. On the other hand, when an external magnetic field is applied in the −X direction, the electrical resistance of first and fourth magneto-resistance effect elements 21, 24 is increased, the electrical resistance of second and third magneto-resistance effect elements 22, 23 is reduced. Thus, mid-point voltage V1 is lowered, and mid-point voltage V2 is increased. Therefore, by detecting V1−V2 which is the difference between mid-point voltages V1 and V2, twice the sensitivity, as compared with the case of detecting either mid-point voltage V1 or V2, is obtained. Furthermore, by detecting V1−V2 even when mid-point voltages V1 and V2 are offset, it is possible to eliminate the effect of the offsets.

Next, by comprising two sets of sense magnet 13 and magnetic sensor 20, the reason why the deterioration in position detection accuracy by magnetic sensor 20 is reduced will be described with reference to the drawings.

Figure 4:
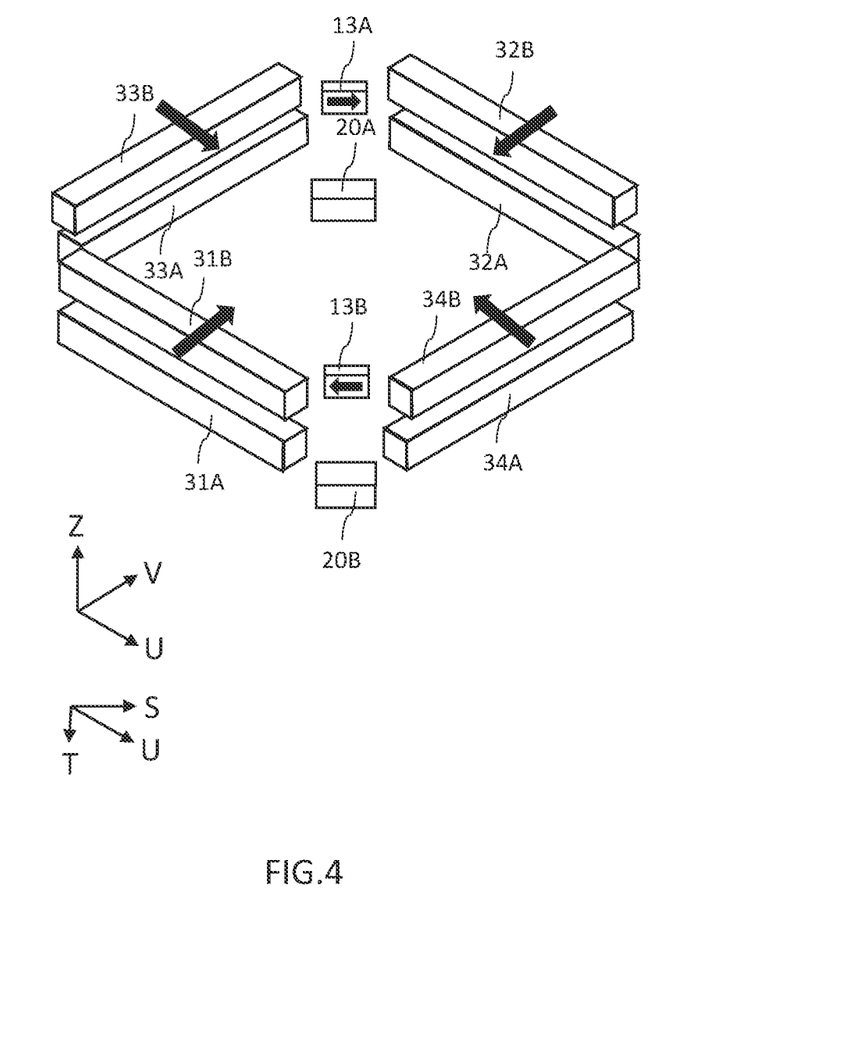
FIG. 4 is a perspective view showing an arrangement example of two sets of sense magnets and magnetic sensors included in a position detecting device.

FIG. 4 is a perspective view showing an arrangement example of two sets of sense magnets and the magnetic sensors included in a position detecting device. FIGS. 5A to 5C, FIGS. 6A to 6C, FIGS. 7A to 7C and FIGS. 8A to 8C are graphs showing the simulation results of the output voltages of the magnetic sensors shown in FIG. 4.

FIG. 4 shows a configuration in which first driving magnets 31A, 31B, second driving magnets 32A, 32B, third driving magnets 33A, 33B, fourth driving magnets 34A, 34B, first sense magnet 13A, second sense magnet 13B, first magnetic sensor 20A and second magnetic sensor 20B are extracted from the camera module 100 shown in FIGS. 1 and 2. In the example shown in FIG. 4, the magnetization directions of first driving magnet 31B, second driving magnet 32B, third driving magnet 33B and fourth driving magnet 34B are the respective directions opposite to the camera module 100 shown in FIG. 1. FIG. 4 is a configuration that is used to simulate the output voltages of magnetic sensor 20, shown as results, in FIGS. 5A to 5C, FIGS. 6A to 6C, FIGS. 7A to 7C and FIGS. 8A to 8C.

The arrow of S-axis direction shown in FIG. 4 is perpendicular to the Z-axis direction and is a direction of +45 degrees with respect to the U-axis. The arrow of T-axis direction shown in FIG. 4 is perpendicular to the Z-axis direction and is perpendicular to the S-axis direction. In FIG. 4, the direction of the arrows of Z-axis, U-axis, V-axis, S-axis and T-axis indicate the respective plus (+) directions, and the direction opposite to the arrows indicate the respective minus (−) direction.

In the example shown in FIG. 4, first sense magnet 13A and second sense magnet 13B are arranged such that each magnetization direction is parallel to the S-axis direction. The magnetization direction of first sense magnet 13A and the magnetization direction of second sense magnet 13B are opposite to each other. Furthermore, in the example shown in FIG. 4, first magnetic sensor 20A is arranged such that the magnetization direction is parallel to the magnetization direction of first sense magnet 13A, second magnetic sensor 20B is arranged such that the magnetization direction is parallel to the magnetization direction of second sense magnet 13B. The magneto-sensitive directions of first magnetic sensor 20A and second magnetic sensor 20B are the same direction. If the magnetization directions of first sense magnet 13A and second sense magnet 13B are the same, first magnetic sensor 20A and second magnetic sensor 20B may be arranged such that the respective magneto-sensitive directions are opposite to each other.

Figure 5A:
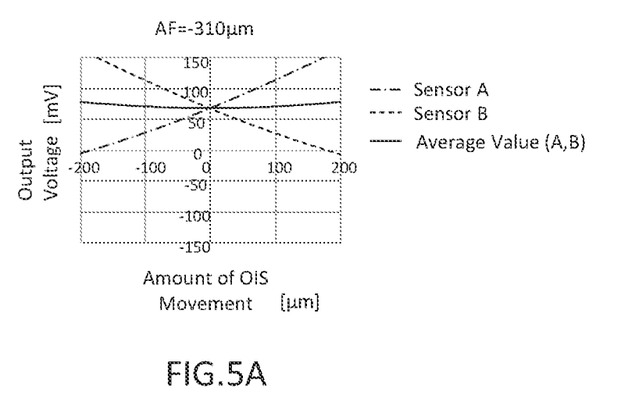
FIGS. 5A-5C are graphs showing the simulation results of the output voltages of the magnetic sensors shown in FIG. 4.
Figure 5B:
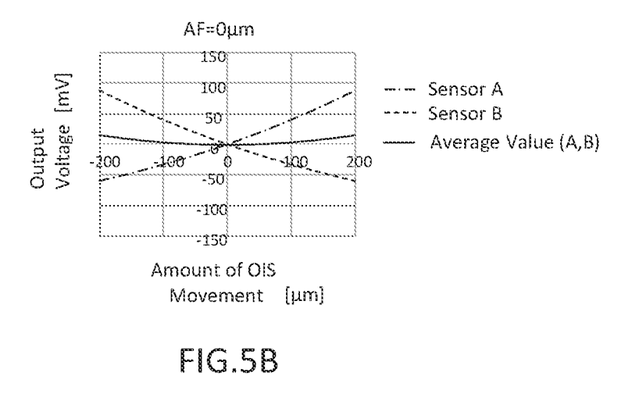
Figure 5C:
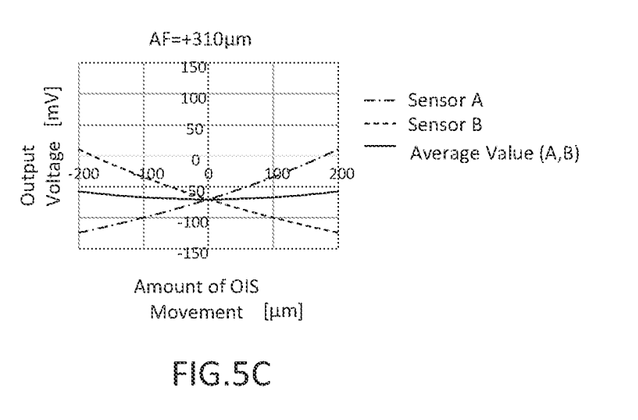

FIG. 5A shows the output voltages (differences in mid-point voltages) of first magnetic sensor 20A (sensor A) and second magnetic sensor 20B (sensor B) and the average values thereof with respect to the amount of movement (amount of OIS movement) when first sense magnet 13A and second sense magnet 13B are located at a position of −310 μm (AF=−310 μm) from a predetermined moving center in the Z-axis direction and are moved in the S-axis direction in FIG. 4. FIG. 5B shows the output voltages (differences in mid-point voltages) of first magnetic sensor 20A (sensor A) and second magnetic sensor 20B (sensor B) and the average values thereof with respect to the amount of movement (amount of OIS movement) when first sense magnet 13A and second sense magnet 13B are located at a predetermined moving center (AF=0 μm) in the Z-axis direction and are moved in the S-axis direction in FIG. 4. FIG. 5C shows the output voltages (differences in mid-point voltages) of first magnetic sensor 20A (sensor A) and second magnetic sensor 20B (sensor B) and the average values thereof with respect to the amount of movement (amount of OIS movement) when first sense magnet 13A and second sense magnet 13B are located at a position of +310 μm (AF=+310 μm) from a predetermined moving center in the Z-axis direction and are moved in the S-axis direction in FIG. 4.

Figure 6A:
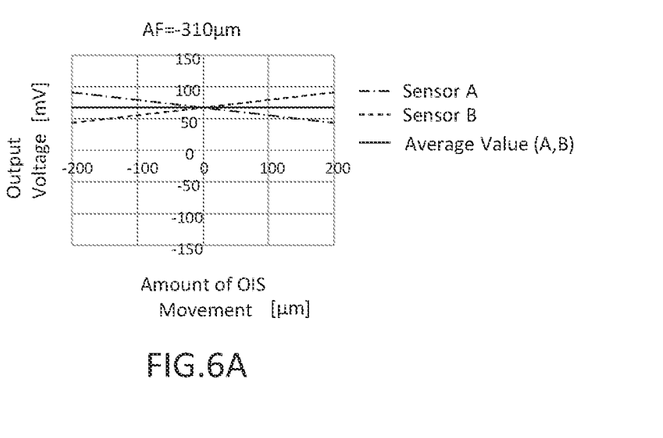
FIGS. 6A-6C are graphs showing the simulation results of the output voltages of the magnetic sensors shown in FIG. 4.
Figure 6B:
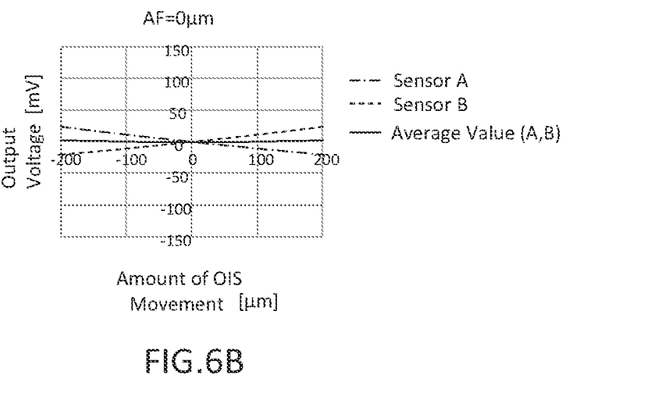
Figure 6C:
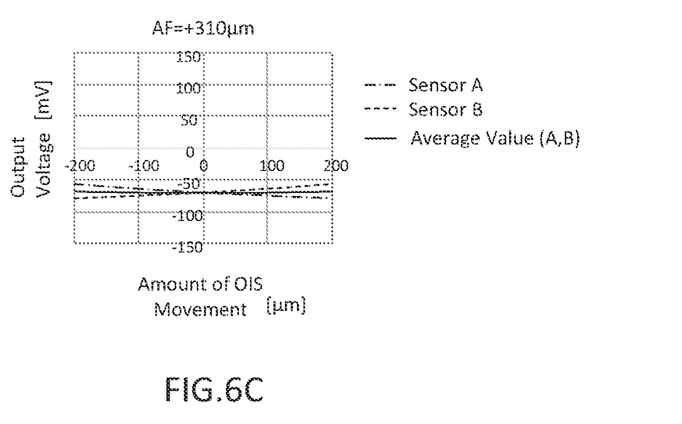
Figure 7A:
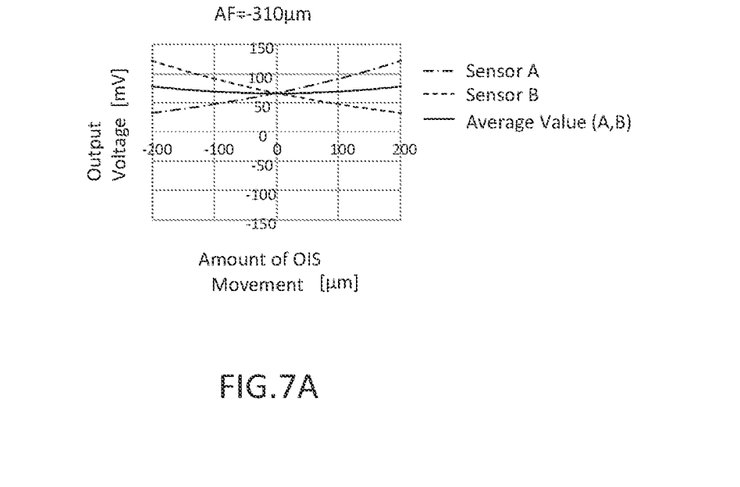
FIGS. 7A-7C are graphs showing the simulation results of the output voltages of the magnetic sensors shown in FIG. 4.
Figure 7B:
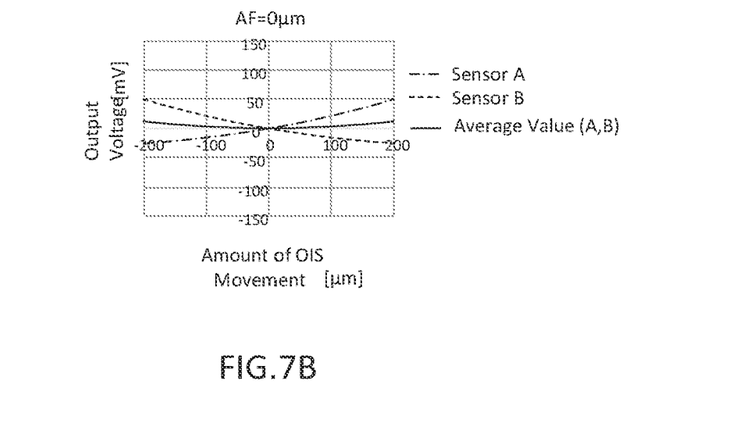
Figure 7C:
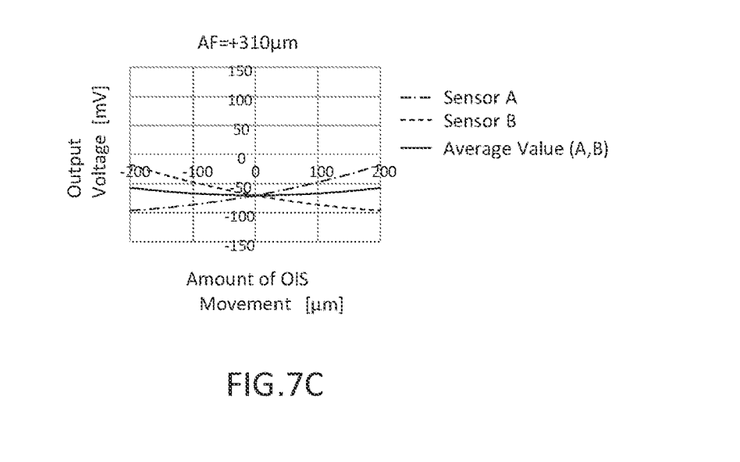
Figure 8A:
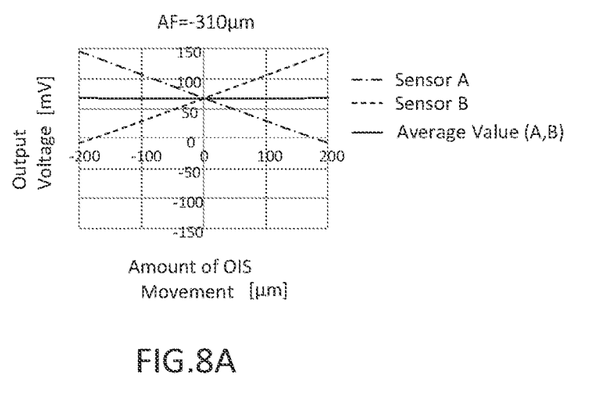
FIGS. 8A-8C are graphs showing the simulation results of the output voltages of the magnetic sensors shown in FIG. 4.
Figure 8B:
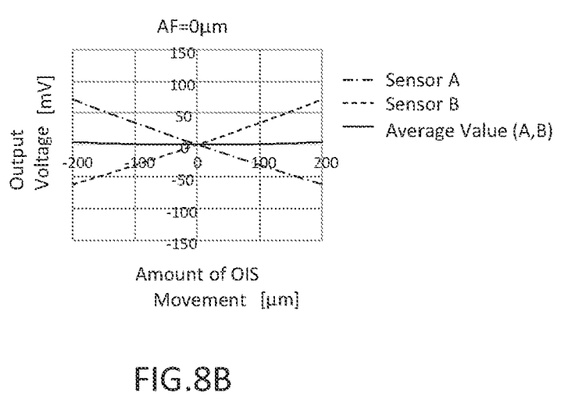
Figure 8C:
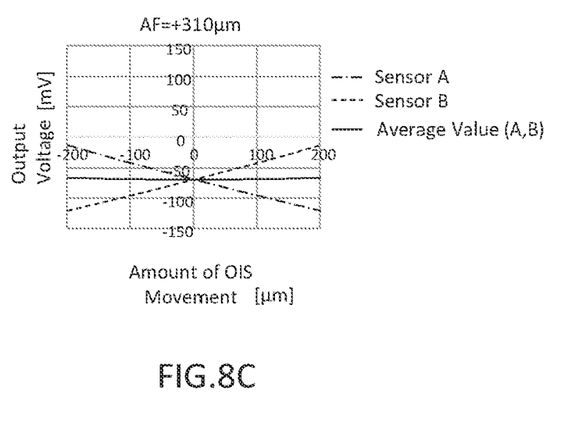

Similarly, FIGS. 6A to 6C show the output voltages (differences in mid-point voltages) of first magnetic sensor 20A (sensor A) and second magnetic sensor 20B (sensor B) and the average values thereof with respect to the amount of movement (amount of OIS movement) when first sense magnet 13A and second sense magnet 13B are located at positions of −310 μm, 0 μm, +310 μm from a predetermined moving center in the Z-axis direction and are moved in the T-axis direction in FIG. 4. FIGS. 7A to 7C show the output voltages (differences in mid-point voltages) of first magnetic sensor 20A (sensor A) and second magnetic sensor 20B (sensor B) and the average values thereof with respect to the amount of movement (amount of OIS movement) when first sense magnet 13A and second sense magnet 13B are located at positions of −310 μm, 0 μm, +310 μm from a predetermined moving center in the Z-axis direction and are moved in the V-axis direction in FIG. 4. FIGS. 8A to 8C show the output voltages (differences in mid-point voltages) of first magnetic sensor 20A (sensor A) and second magnetic sensor 20B (sensor B) and the average values thereof with respect to the amount of movement (amount of OIS movement) when first sense magnet 13A and second sense magnet 13B are located at positions of −310 μm, 0 μm, +310 μm from a predetermined moving center in the Z-axis direction and are moved in the U-axis direction in FIG. 4.

In position detecting device 1 comprising two sets of sense magnets 13 and magnetic sensor 20 shown in FIGS. 1 and 4, first sense magnet 13A and second sense magnet 13B are moved the same amount in the same direction in the U-axis direction or V-axis direction by OIS. Furthermore, the magnetization directions of first sense magnet 13A and second sense magnet 13B are opposite to each other. Therefore, the composite magnetic fields applied to first magnetic sensor 20A and second magnetic sensor 20B, when first sense magnet 13A and second sense magnet 13B are moved due to OIS in any position in the Z-axis direction, substantially change point symmetry with respect to the moving center (amount of OIS movement=0 μm). That is, the output voltages of first magnetic sensor 20A (the sensor A) and second magnetic sensor 20B (the sensor B) substantially vary point symmetrically with respect to the moving center (amount of OIS movement=0 μm) according to the amount of OIS movement, as shown in FIGS. 5A to 5C. FIGS. 6A to 6C, FIGS. 7A to 7C, and FIGS. 8A to 8C.

Furthermore, as regards the same amount of OIS movement, the output voltages of first magnetic sensor 20A (sensor A) and second magnetic sensor 20B (sensor B) are substantially symmetrical with respect to the voltage values corresponding to the position in the Z-axis direction. Therefore, if the sum value or average value of the output voltages of first magnetic sensor 20A (sensor A) and second magnetic sensor 20B (sensor B) is obtained, even if the positional relationship between magnetic sensor 20 and sense magnet 13 is changed due to the OIS, it is possible to obtain a position detection result that cancels the variation. FIGS. 5A to 5C, FIGS. 6A to 6C, FIGS. 7A to 7C, and FIGS. 8A to 8C show that a good position detection result can be obtained, by obtaining an average value of the output voltages of first magnetic sensor 20A (sensor A) and the output voltage of second magnetic sensor 20B (sensor B). Therefore, by comprising two sets of sense magnet 13 and magnetic sensor 20, it is possible to reduce the deterioration in position detection accuracy by magnetic sensor 20.

As described above, Patent Document 3, in order to reduce the influence of the noise magnetic field applied to the magnetic sensor, proposes a configuration comprising a plurality of magnetic sensors. Specifically. Patent Document 3, obtains the difference between the mid-point voltages of each magnetic sensor, and outputs a position detecting signal indicating the position of lens 5 by adding the differences between the voltages obtained from each magnetic sensor.

However, in the configuration described in Patent Document 3, the wiring in board 7 becomes complicated, and the driving IC (Integrated Circuit) for processing the output signals of the plurality of magnetic sensors 20 is required. As described above, since the position of the detection target can be detected by using one set of sense magnet 13A and magnetic sensor 20A (or sense magnet 13B and magnetic sensor 20B), most of the driving device ICs on the market is for processing the output signal of magnetic sensor 20A or 20B. Thus, the driving IC for processing the output signals of the plurality of magnetic sensors 20 (both 20A and 20B) is expensive even when commercially available, resulting in an increase in the cost of the camera including camera module 100.

Figure 9:
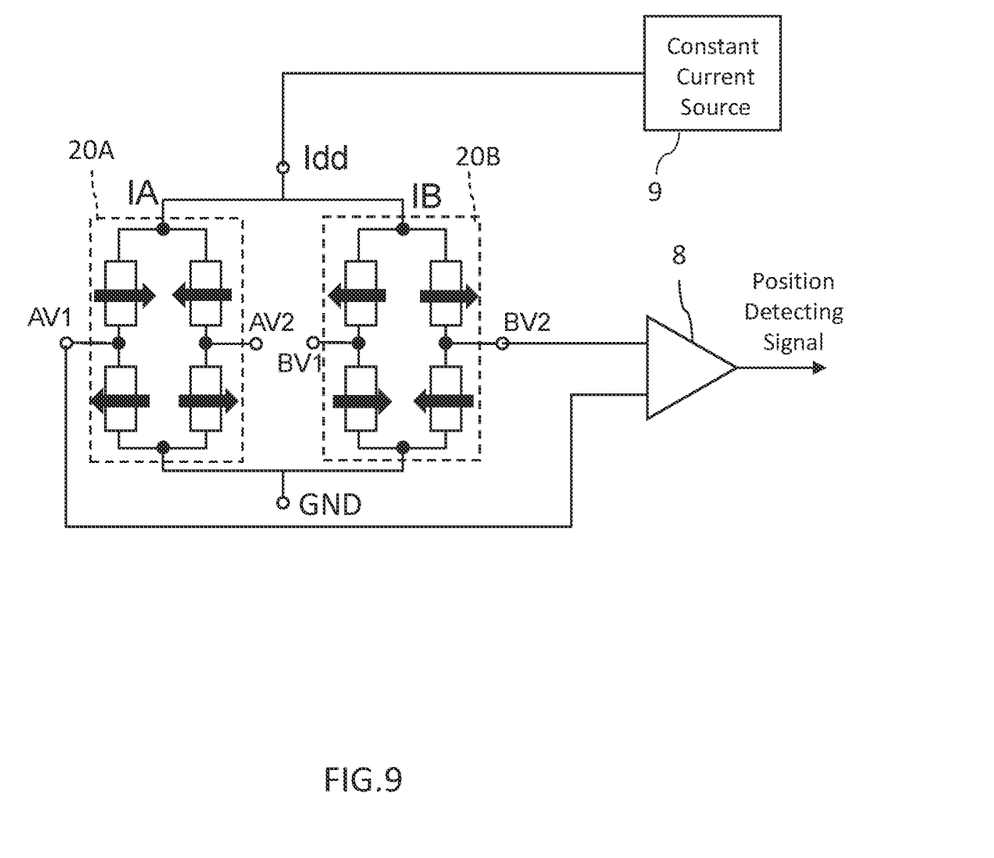
FIG. 9 is a circuit diagram showing an example of a measurement circuit of the position detecting signal of the present embodiment.
Figure 10:
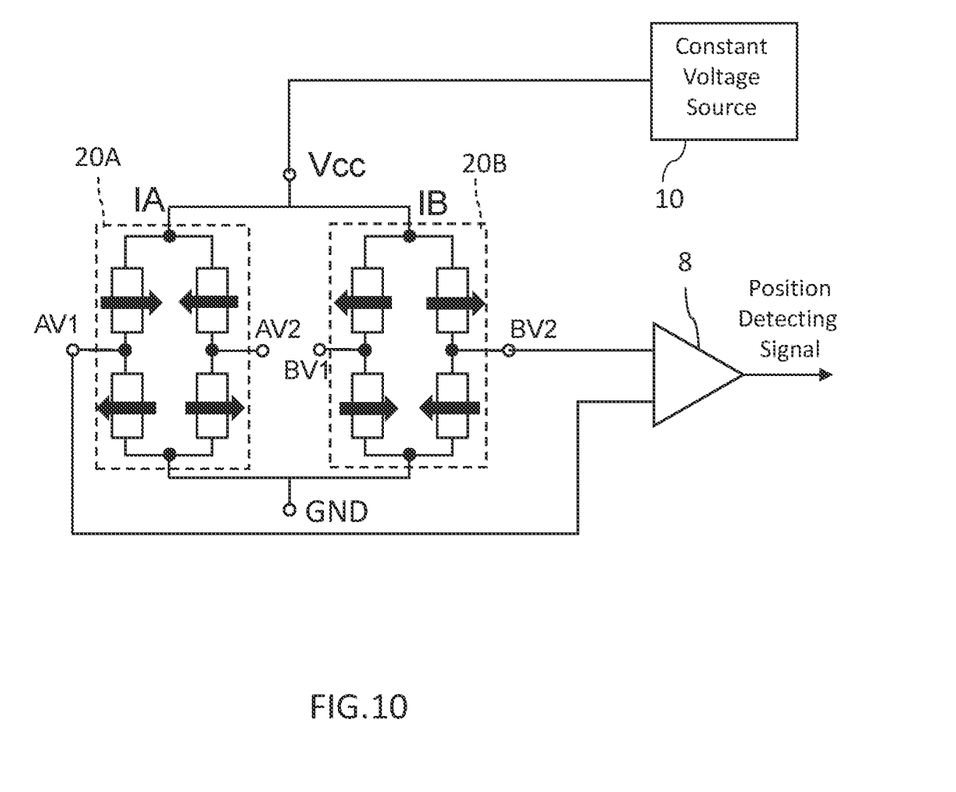
FIG. 10 is a circuit diagram showing another example of a measurement circuit of the position detecting signal of the present embodiment.

Therefore, in this embodiment, as shown in FIG. 9, first magnetic sensor 20A and second magnetic sensor 20B are connected in parallel, and are supplied a predetermined direct current (Idd) from shared constant current source 9. Furthermore, difference AV1−BV2 between mid-point voltage AV1 of first magnetic sensor 20A and mid-point voltage BV2 of second magnetic sensor 20B is obtained, difference AV1−BV2 is output as a position detecting signal of lens 5. Difference AV1−BV2 of the mid-point voltage may be obtained using a well-known differential amplifier 8. Differential amplifier 8 may output difference AV2−BV1 between mid-point voltage AV2 of first magnetic sensor 20A and mid-point voltage BV1 of second magnetic sensor 20B as a position detecting signal. As shown in FIG. 10, first magnetic sensor 20A and second magnetic sensor 20B which are connected in parallel may be applied with a predetermined DC (direct current) voltage (Vcc) from shared constant voltage source 10.

As described above, the composite magnetic fields applied to first magnetic sensor 20A and second magnetic sensor 20B are in directions opposite to each other. Therefore, as shown in FIGS. 9 and 10, it is assumed that the first to fourth magneto-resistance effect elements included in first magnetic sensor 20A and the first to fourth magneto-resistance effect elements included in second magnetic sensor 20B have directions in which the magnetization directions of the respective fixed layers are opposite to each other.

In this case, the magnetization directions of the fixed layers of the first and second magneto-resistance effect elements included in first magnetic sensor 20A and the magnetization directions of the fixed layers of the third and fourth magneto-resistance effect elements included in second magnetic sensor 20B are the same. Also, the magnetization directions of the fixed layers of the third and fourth magneto-resistance effect elements included in first magnetic sensor 20A and the magnetization directions of the fixed layers of the first and second magneto-resistance effect elements included in second magnetic sensor 20B are the same.

Even in the configuration of the present invention for obtaining difference AV1–BV2 of the mid-point voltages of two magnetic sensors 20 as shown in FIGS. 9 and 10, it is possible to obtain a position detecting signal similar to the configuration of the prior art in which differences V1–V2 between the mid-point voltages of two magnetic sensors 20, respectively are obtained and added to them. Here, when lens 5 is moved in a direction that is perpendicular to the Z-axis direction due to OIS, by placing two sense magnets 13 such that the change in the directions of the composite magnetic fields applied to two magnetic sensors 20 is canceled, it is possible to accurately detect the position of the detection target even if positional relationship between magnetic sensor 20 and sense magnet 13 is varied.

Also, in the configuration for obtaining difference AV1–BV2 of the mid-point voltages of two magnetic sensors 20, since the wiring for connecting two magnetic sensors 20 and differential amplifier 8 is reduced as compared with the prior art configuration, the wiring formed on board 7 does not become complicated. Furthermore, in the configuration for determining difference AV1–BV2 of the mid-point voltages of two magnetic sensors 20, it is possible to use a commercially available driving IC to process the output signal of one magnetic sensor 20 (20A or 20B), but this does not cause to an increase in cost.

In position detecting device 1 of the present embodiment, as shown in FIG. 9, two magnetic sensors 20 are connected in parallel, and are supplied a predetermined direct current from constant current source 9. Therefore, if there is a slight difference in the electrical resistances of two magnetic sensors 20, different currents corresponding to the difference are supplied to two magnetic sensors 20. Because mid-point voltage of magnetic sensor 20 depends on the product of the resistance value and the current value of the magneto-resistance effect element, even if there is a variation in the electrical resistances of two magnetic sensors 20, the variation of the mid-point voltages is reduced by the current corresponding to the variation is supplied. Therefore, it is possible to correct the variation in the sensitivity of two magnetic sensors 20.

Alternatively, in position detecting device 1 of the present embodiment, as shown in FIG. 10, two magnetic sensors 20 are connected in parallel, and are supplied a predetermined DC voltage from constant voltage source 10. In such a configuration, because the same DC voltage is supplied to each of two magnetic sensors 20, even if there is a variation in the electric resistance of two magnetic sensors 20, the variation of each mid-point voltage is reduced, also the variation in sensitivity is reduced Therefore, it is possible to detect the position of lens 5 with the same accuracy as in the prior art configuration in which the differences between the mid-point voltages of two magnetic sensors 20 are respectively obtained and added.

As described above, according to the present embodiment, by comprising two sets of sense magnet 13 and magnetic sensor 20, even if the positional relationship between magnetic sensor 20 and sense magnet 13 varies, the position of lens 5 that is a detection target can be accurately detected.

By obtaining difference AV1–BV2 between mid-point voltage AV1 of first magnetic sensor 20A and mid-point voltage BV2 of second magnetic sensor 20B, and by outputting this difference as a position detecting signal of the detected object, the wiring does not become complicated, and it does not cause an increase in cost.

Furthermore, by connecting two magnetic sensors 20 in parallel and by supplying a direct current from constant current source 9, it is possible to correct variations in sensitivity of two magnetic sensors 20. Alternatively, by connecting two magnetic sensors 20 in parallel and by applying a predetermined DC voltage from constant voltage source 10, even if there is variation in the sensitivity of two magnetic sensors 20, it is possible to detect the position of lens 5 with the same accuracy as in the configuration of the conventional technology.

While the invention has been particularly shown and described with reference to exemplary embodiments thereof, the invention is not limited to these embodiments. It will be understood by those ordinarily skilled in the art that various changes in form and details may be made therein without departing from the spirit and scope of the present invention as defined by the claims.

What is claimed is:

1. A method of correcting a position detecting signal, wherein a detection target is movable in a first direction and in a second direction that is perpendicular to said first direction within a predetermined movable range in each direction, for correcting the position detecting signal of said detection target in said first direction in response to movement in said second direction, the method comprising:
arranging a first magnet and a second magnet so as to move integrally with the movement of said detection target;
arranging a first magnetic detecting circuit to detect a magnetic field of said first magnet and a second magnetic detecting circuit to detect a magnetic field of said second magnet, at a position outside said movable range in said first direction, respectively; and
amplifying the difference between the detection signals of the magnetic field output from said first magnetic detecting circuit and said second magnetic detecting circuit by a differential amplifier and outputting the amplified difference between the detection signals as a position detecting signal after movement of said detection target in said first direction.

2. The method of correcting the position detecting signal according to claim 1, further comprising:
connecting said first magnetic detecting circuit and said second magnetic detecting circuit in parallel; and
supplying a direct current to said first magnetic detecting circuit and said second magnetic detecting circuit from a shared constant current source.

3. The method of correcting the position detecting signal according to claim 1, further comprising:
connecting said first magnetic detecting circuit and said second magnetic detecting circuit in parallel; and
supplying a DC voltage to said first magnetic detecting circuit and said second magnetic detecting circuit from a shared constant voltage source.

4. The method of correcting the position detecting signal according to claim 1, wherein:
said first magnetic detecting circuit comprises a first magneto-resistance effect element and a second magneto-resistance effect element connected in series, outputting a detection signal of said magnetic field from the connection point between said first magneto-resistance effect element and said second magneto-resistance effect element;

said second magnetic detecting circuit comprises a third magneto-resistance effect element and a fourth magneto-resistance effect element connected in series, outputting a detection signal of said magnetic field from the connection point between said third magneto-resistance effect element and said forth magneto-resistance effect element, wherein:

said first magneto-resistance effect element, said second magneto-resistance effect element, said third magneto-resistance effect element and said fourth magnetoresistance effect element include a fixed layer having a constant magnetization direction regardless of an external magnetic field, and a free layer in which magnetization direction is changed by the external magnetic field, respectively;

the magnetization direction of said first magnet and the magnetization direction of said second magnet are opposite; and the magnetization direction of said fixed layers in said first magnetoresistance effect element and said third magneto-resistance effect element, and the magnetization direction of said fixed layers in said second magneto-resistance effect element and said fourth magneto-resistance effect element are the same.

5. The method of correcting the position detecting signal according to claim 1, wherein:

said first magnet and said second magnet are arranged at positions where the change in the directions of the magnetic fields applied to said first magnetic detecting circuit and said second magnetic detecting circuit are canceled.

6. A position detecting device for detecting the position of a detection target which is movable within a predetermined movable range, comprising:

a first magnet and a second magnet that are arranged so as to move integrally with the movement of said detection target;

a first magnetic detecting circuit that detects a magnetic field of said first magnet and a second magnetic detecting circuit that detects a magnetic field of said second magnet, which are arranged at a position outside said movable range; and a differential amplifier that amplifies the difference between the detection signals of the magnetic field output from said first magnetic detecting circuit and said second magnetic detecting circuit, and that outputs the amplified difference between the detection signals as a position detecting signal of said detection target.

7. The position detecting device according to claim 6, wherein:

said first magnetic detecting circuit and said second magnetic detecting circuit are connected in parallel;

the position detecting device further comprising:

a shared constant current source that supplies a direct current to said first magnetic detecting circuit and said second magnetic detecting circuit connected in parallel.

8. The position detecting device according to claim 6, wherein:

said first magnetic detecting circuit and said second magnetic detecting circuit are connected in parallel;

the position detecting device further comprising:

a shared constant voltage source that supplies a DC voltage to said first magnetic detecting circuit and said second magnetic detecting circuit connected in parallel.

9. The position detecting device according to claim 6, wherein:

said first magnetic detecting circuit comprises a first magneto-resistance effect element and a second magneto-resistance effect element connected in series, and outputs a detection signal of said magnetic field from the connection point between said first magneto-resistance effect element and said second magnetoresistance effect element;

said second magnetic detecting circuit comprises a third magneto-resistance effect element and a fourth magneto-resistance effect element connected in series, and outputs a detection signal of said magnetic field from the connection point between said third magneto-resistance effect element and said forth magneto-resistance effect element, wherein:

said first magneto-resistance effect element, said second magneto-resistance effect element, said third magneto-resistance effect element and said fourth magnetoresistance effect element include a fixed layer having a constant magnetization direction regardless of an external magnetic field, and a free layer in which magnetization direction is changed by the external magnetic field, respectively;

the magnetization direction of said first magnet and the magnetization direction of said second magnet are opposite; and the magnetization direction of said fixed layers in said first magnetoresistance effect element and said third magneto-resistance effect element, and the magnetization direction of said fixed layers in said second magneto-resistance effect element and said fourth magneto-resistance effect element are the same.

10. The position detecting device according to claim 6, wherein:

said first magnet and said second magnet are arranged at positions where the change in the directions of the magnetic fields applied to said first magnetic detecting circuit and said second magnetic detecting circuit are canceled.

* * * * *